F. WHITNEY.
ROLLER BEARING.
APPLICATION FILED OCT. 2, 1913.
1,188,592.  Patented June 27, 1916.
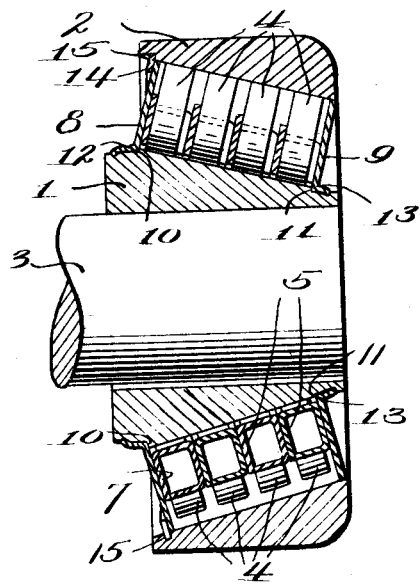
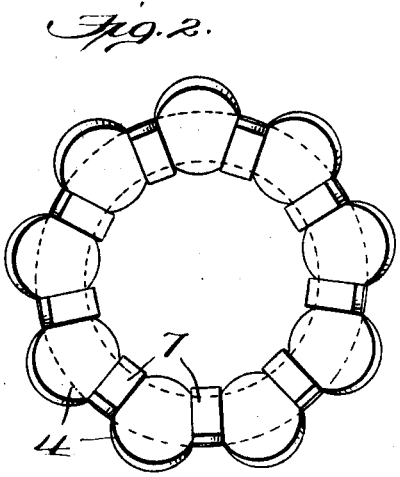
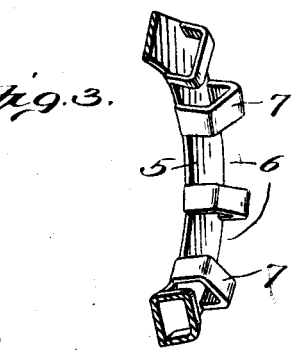
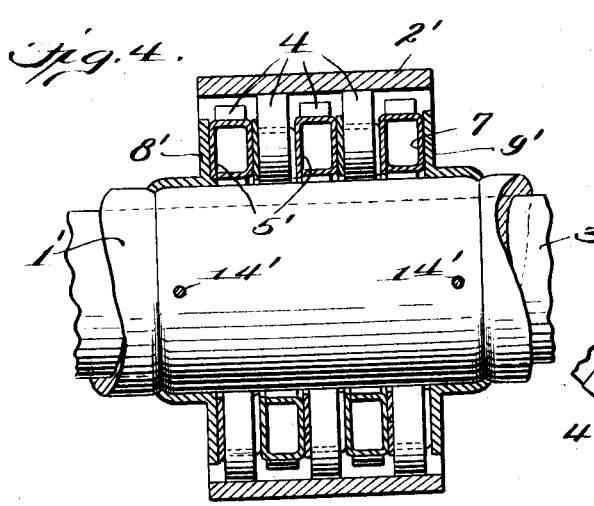
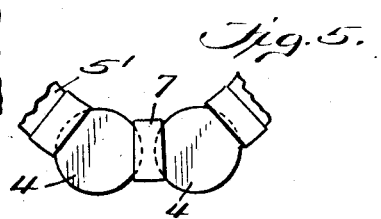
Inventor
Frank Whitney
by James L. Norris
Attorney
Witnesses:

UNITED STATES PATENT OFFICE.

FRANK WHITNEY, OF HUBBARD WOODS, ILLINOIS.

ROLLER-BEARING.

1,188,592.

Specification of Letters Patent.

Patented June 27, 1916.

Application filed October 2, 1913. Serial No. 793,038.

*To all whom it may concern:*

Be it known that I, FRANK WHITNEY, a citizen of the United States, residing at Hubbard Woods, in the county of Cook and State of Illinois, have invented new and useful Improvements in Roller-Bearings, of which the following is a specification.

The present invention has reference to roller bearings, and it resides, primarily, in the production of an improved bearing of the general type or character specified embodying a plurality of roller-carrying elements which are designed for bodily rotary movement in either direction independently of or relative to each other, but are held against relative or independent lateral movement. The number of such elements may be varied at will, with a resultant variation in the length of the compound bearing, so that by simply increasing the same the bearing may be made to carry a maximum load at a maximum speed.

As a further object, the invention comprehends an improved form of roller-carrying element capable of manufacture at a low cost, and by a simple operation, and in conformity with the angles of the bearing surfaces between which it is interposed, and so constructed as to provide for the ready insertion and removal of the rollers, as well as their retention in place when inserted. These elements consist, each, of an annular cage or ring provided with roller-seats, the width of such cage being less than the diameter of the rollers, so that the latter are thus caused to engage the bearing surfaces. The rollers are arranged in single file, in circular series, in their seats, and the cages themselves are arranged co-axially with one another and with the bearing members, and are suitably held in place, in order to unify the entire bearing, and obtain a maximum simplicity in handling, marketing and installing.

In the accompanying drawing, Figure 1 is a sectional view of a roller bearing constructed in accordance with the invention; Fig. 2 is a plan view of one of the cages, with the rollers in place therein; Fig. 3 is a fragmental perspective view of the empty cage; Fig. 4 is a sectional view of a modified bearing; and Fig. 5 is a fragmental view of one of the cages and its associated rollers shown in such modification.

Roller bearings embodying the present invention are capable of use in all cases where it is desirable or necessary to eliminate or minimize friction. Owing to the various conditions in which the bearing may be used in practice, it is obvious that the construction of the bearing itself, and the construction and arrangement of the bearing surfaces of its inner and outer members may differ in order that the best results may be obtained, and while two constructions have been represented, the same main principles of the invention are involved in both.

In the construction shown in Fig. 1, 1 and 2 indicate, respectively, the inner and outer members of the bearing, and 3 the shaft whereon the former member is keyed or otherwise suitably mounted. These members are here depicted as cones, the working or bearing surfaces of which are precisely parallel, the cones thus being of equal angles. On the other hand, in the construction illustrated in Fig. 4, the outer bearing member 2' is in the form of a cylindrical sleeve, while the inner bearing member 1' is constituted by the shaft itself, the inner member in each instance being designed for rotation relatively to the outer member.

The roller elements, according to this invention, are in the form of thin, flat cylindrical disks 4 which are of the same diameter and are adapted to bear evenly upon the parallel surfaces presented by the inner and outer bearing members. These disks are arranged in circular series, of which a plurality is employed, in the bearing, and each series is carried by a cage, the number of cages, and, in fact, of rollers mounted in each cage, being determined according to existing conditions and objects of work. The cages are arranged side by side in the bearing space, in co-axial relation to one another and to the bearing members, and each preferably consists of a ring, constructed from sheet metal or other suitable material. The form of these rings necessarily varies, to suit the shape of the particular bearing members with which they are to be used; thus, in Fig. 1, where cone bearings are employed, the rings 5 are dished toward the base of the inner cone 1, but where the bearing surfaces are truly cylindrical, as in Fig. 4, the planes of the rings 5' are at right angles to the axes of such surface, the rings in each construction, however, being arranged in parallel planes. To retain the rollers in place thereon, the rings are provided with a circular series of pockets 6 wherein the rollers are fitted, the width of the rings being appreciably less than the diameter of the rollers, so that the peripheries of the latter are thereby enabled to engage the bearing surfaces. The pockets themselves are produced by means of radial extensions or tongues 7, which are preferably formed integral with said rings at the inner edges thereof, the tongues being bent first outwardly from the rings, then laterally thereacross, and finally inwardly toward the rings. The tongues are spaced apart, as shown, and thus produce or form a series of three-sided transverse partitions or straps, the spaces between adjacent straps constituting the pockets in question and being regulated according to the number and size of the disks. Also, the contiguous bent portions or sections of the straps are disposed at right angles to each other and to the ring, and their terminals or free ends are in contact with the ring, the central section of each strap being spaced sufficiently far from the ring to permit the introduction of the disks therebeneath.

While, as previously stated, the material of which the cages are formed may vary, it is preferable that sheet material may be used for this purpose, since the cages may be stamped or struck out and the tongues bent into position by a single operation, thereby reducing the cost of manufacture to an appreciable extent. Moreover, and this is a matter of very considerable importance, the afore-mentioned straps in such instance, will possess a degree of inherent resilience sufficient to enable them to be forced apart at their outer ends during the introduction of the disks into the pockets, and to subsequently assume their original positions after the introduction has been completed, thereby holding the disks in place without requiring extraneous fastening means of any character. However, although this construction and arrangement is considered most advantageous, other mountings for the disks may be adopted, with or without devices of the character just specified, and cast metal or other material may be utilized if preferred.

Means are provided for retaining the loaded cages in assembled position in the bearing space, and such means consists, by preference, of suitable annular metallic washers which are themselves held in place in any desired manner. They are arranged at or in the opposite ends of the aforesaid space and may have any constructional form and arrangement advisable,—that is to say, either or both may be fixed, detachable or adjustable—, but since no definite arrangement is essential to the invention, elaborate description and illustration are omitted. It is sufficient to state, therefore, that in the construction represented in Fig. 1, the washers 8 and 9 are of angular cross-section and encircle the inner bearing 1, the latter being provided adjacent its ends with circumferential shoulders 10 and 11 which are engaged by the shoulders 12 and 13 produced on said washers at the junction of their outer and inner portions or members. The washer, in this construction, is retained by a device here shown as consisting of a split spring ring 14 which fits in a circumferential groove or seat 15 in the bearing surface of the outer cone or bearing member 2 and projects across said washer, as represented in Fig. 1, and a similar or other device may, if desired, be employed in connection with the other washer 9. In the embodiment depicted in Fig. 4, the washers 8' and 9' are likewise of angular cross-section, are of counterpart construction, and are attached by bolts or other suitable fasteners 14'.

From the foregoing, it will be understood, therefore, that the cages and their respective sets of rollers are capable of differential movement in either direction, but are held against lateral movement by the washers, and, also, that the rollers are distributed equidistantly around the cages and engage both bearing surfaces, the disposition of the rings or cage bodies being regulated in accordance with the angularity of such surfaces. The cages have the same relative arrangement under all conditions, i. e., the straps or tongues of each cage project toward the body of the next adjacent cage, thereby preventing interference between the cages during their differential movements, and the number of such cages and of the rollers which they carry may be varied to suit the requirements of the work.

I claim:—

1. In a roller bearing, a bearing member having a conical bearing surface and a pair of laterally spaced permanently fixed collars, and a group of cages surrounding the said conical bearing surface between the collars thereon, said cages being provided with expansible mouth pockets adapted to receive disk rollers at their exterior surface and to retain the same.

2. In a combined end thrust and radial load roller bearing, the combination of spaced bearing members having opposed conical bearing surfaces of equal angles, one of said conical surfaces being provided with two rigidly spaced annular collars, a plurality of individual annular series of disk rollers coöperating with said members between said collars, and a plurality of cages of different diameters arranged side by side between said members and collars, each cage engaging the peripheries and also the sides of the rollers of the respective annular series while the latter coöperate with said conical surfaces.

3. In a combined end thrust and radial load roller bearing, the combination of spaced bearing members having opposed conical bearing surfaces of equal angles, one of said members having a pair of stationary collars, a plurality of individual annular series of disk rollers coöperative with said bearing surfaces between said collars, a plurality of independently rotatable roller spacing rings encircling said member and retained between said collars, each of said rings having a series of pockets for the respective annular series of rollers and each pocket engaging the periphery of a roller to space the same circumferentially and engaging the opposite sides of each roller to guide the same laterally.

4. In a roller bearing embodying disk rollers, a bearing member having a pair of annular collars thereon, a plurality of independently rotatable roller spacing rings arranged side by side encircling said member between said collars, each of said rings having a series of roller containing pockets, each pocket provided with an expansible opening on its outer edge to receive said rollers and to retain the same.

5. A ring cage for roller bearings provided with a series of flat pockets partially enveloping the ends and faces of a plurality of disk rollers arranged edgewise in a circle, said cage adapted to encircle a bearing member between spaced annular collars, said pockets having flexible mouths at their exposed periphery adapted to the transfer of the said disk rollers to or from said cage.

6. A roller bearing embodying two bearing members having roller-engaging surfaces of the same angle, annular flanges at the ends of one of said members, a cage between said flanges and encircling the bearing member carrying them, said cage containing a single series of cylindrical-faced rollers, one of the bearing members being provided with a groove, and a split ring seated in said groove and coöperating with one of the flanges of the opposing member to retain the bearing members in correct lateral relation.

7. A bearing member having a pair of axially spaced collars permanently fixed thereon, a plurality of annular series of disk rollers coöperating with said member between said collars, and a plurality of rotatable rings retained between said collars, each ring coöperating with portions of both sides and the peripheries of the disk rollers of the respective series to guide the same laterally and to space the same circumferentially.

8. In a combined thrust and radial load roller bearing, a bearing unit comprising, in combination, a bearing member, a pair of axially spaced collars fixed thereon, a plurality of annular series of disk rollers coöperating with said member between said collars, and a plurality of rotatable rings retained between said collars, each ring coöperating with portions of the rolling face and both sides of the disk rollers of the respective series.

9. In a combined thrust and radial load bearing, an inner cone having permanently combined therewith as a unit a pair of axially spaced collars, a plurality of annular series of disk rollers coöperating with said cone between said collars, and a plurality of ring cages on said cone between said collars, each cage spacing circumferentially and furnishing vertical support to the sides of the rollers of the respective annular series.

10. For roller bearings embodying disk rollers, a flat cage comprising a plurality of flat pockets arranged edgewise in a circle, each of said pockets having an expansible opening at its outer edge adapted to receive a single disk roller and retain same isolated.

11. For roller bearings embodying disk rollers, a flat ring provided with integral lugs extending from its inner edge, said lugs being bent out to coöperate with the body of said ring in forming a series of flat pockets with openings at their free ends adapted to expand to receive a disk roller and afterward retain same.

12. For roller bearings embodying disk rollers, a cage adapted to carry a plural number of said rollers edgewise in annular series, each of said rollers being isolated by a pocket, said pocket having an expansible mouth or opening at its outer edge for receiving said roller.

13. For roller bearings, an annular cage provided with a plurality of pockets, each pocket being provided with an expansible opening at the greater circumference of said cage adapted to open to receive the rollers and afterward close and retain them.

14. A cage for roller bearings provided with spacing lugs, the edge of two of same forming the outer opening of a rectangular pocket, said edges adapted to yield during the insertion of a roller therein and afterward return to normal position and partially envelop said roller, said pockets being provided with sides to guide the roller laterally.

15. In a roller bearing, a bearing member, a roller cage encircling said member, the outer circumference of said cage provided with expansible openings adapted to permit rollers to be inserted or withdrawn from said cage while encircling said member.

16. In a combined thrust and radial load bearing, a conical-faced bearing member having a pair of annular collars thereon, a plurality of single annular series of disk rollers encircling said member between said collars, and annular rings each having means projecting from a side thereof to engage the peripheries of the disk rollers to space the same circumferentially, and the body of the ring coöperating with the sides of the rollers to guide the same laterally.

In testimony whereof I have hereunto set my hand in presence of two subscribing witnesses.

FRANK WHITNEY.

Witnesses:
RICHARD C. DEILY,
GEORGIA MARKS.